(No Model.)
W. HECKERT.
LUBRICATING APPARATUS.
No. 425,878. Patented Apr. 15, 1890.
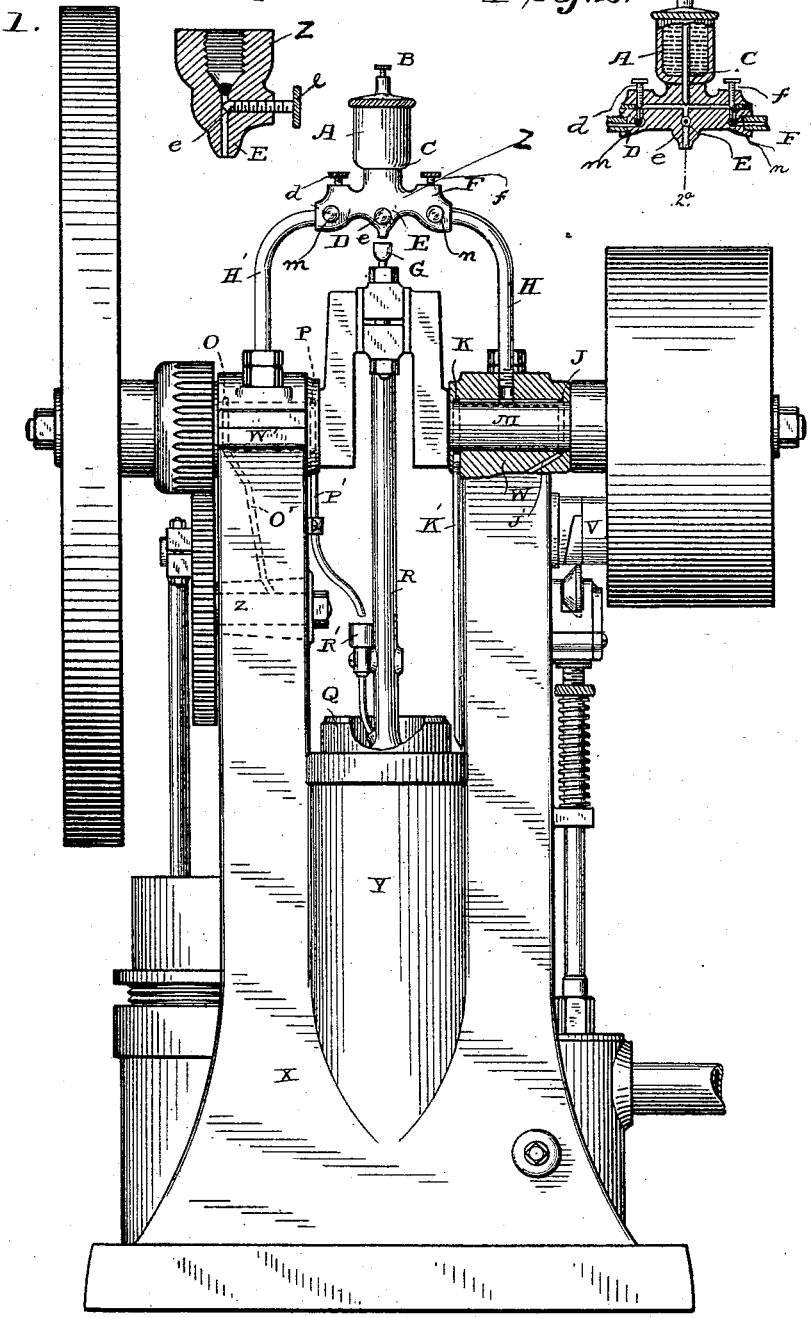
Witnesses
H. H. Lamb
J. H. Brown
Inventor
William Heckert
By his Attorney
A. P. Smith

UNITED STATES PATENT OFFICE.

WILLIAM HECKERT, OF YONKERS, ASSIGNOR TO THE KORTING GAS ENGINE COMPANY, (LIMITED,) OF NEW YORK, N. Y.

LUBRICATING APPARATUS.

SPECIFICATION forming part of Letters Patent No. 425,878, dated April 15, 1890.

Application filed June 15, 1889. Renewed March 19, 1890. Serial No. 344,569. (No model.)

*To all whom it may concern:*

Be it known that I, WILLIAM HECKERT, a citizen of the United States, residing at Yonkers, in the county of Westchester and State of New York, have invented certain new and useful Improvements in Lubricating Apparatus; and I do hereby declare the following to be a full, clear, and exact description of the invention, such as will enable others skilled in the art to which it appertains to make and use the same.

My invention consists in the improved lubricating apparatus for bearings hereinafter to be described and claimed.

In the drawings, Figure 1 represents my invention as applied to an upright gas-engine, one of the bearings of the same being cut away in section. Fig. 2 is a detail view showing the oil-reservoir and its main and branch outlets in section. Fig. 2$^a$ is a cross-section of a modification of Fig. 2, in which the oil-cup is screwed into the yoke Z.

X is the engine-frame, and Y the cylinder.

Q is the trunk-piston operating in the cylinder.

R is the connecting-rod operating on a crank in the shaft M, which shaft runs in bearings W W'. At or near the ends of these bearings are cut the grooves O, P, K, and J. From these grooves channels O', P', K', and J' lead to other portions of the engine where there are bearings to be lubricated. Thus the channel O' leads to the bearing of the stud-journal Z. The pipe P' drips into the cup R' on the connecting-rod R, which lubricates the joint connecting the piston and the piston-rod. The pipe K' drips into the cylinder Y and lubricates the interior of the same. The channel J' conducts the oil to the bearing on which the cam V revolves.

A is the oil-reservoir, which has a main outlet controlled by the pointed valve B, which closes on the seat C. The branch outlets D, E, and F are controlled by the graduated valves *d*, *e*, and *f*. The oil which drips through the branch outlet D passes through the pipe H' to the bearing W'. The oil which passes through the branch outlet E drips into the cup G on the crank-pin bearing. The oil which flows through the branch outlet F passes down the pipe H to the bearing W.

*m* and *n* are sight-holes, through which the dripping of the oil from the graduated valves *d* and *f* can be observed.

The method of operation in my invention is evident. The oil flows from the main reservoir to the various bearings, where after lubricating the surfaces it works out to the grooves placed at or near the ends of the bearings and flows from thence through proper channels to still other bearings, thus realizing to the fullest extent the entire lubricating capacity of the fluid.

The advantage of the arrangement of the oil-reservoir with its main and branch outlets lies in the fact that the adjustment of the graduated valves *d*, *e*, and *f* can be made once for all and is not disturbed by the shutting down or opening of the lubricator. The supply of oil is cut off by the valve B at night when the engine is shut down, and is renewed in the morning when the engine is started up by opening the same without in any way affecting the adjustment of the graduated valves, whereas in most lubricators the adjustment is destroyed every time the oil is shut off.

Having therefore described my invention, what I claim as new, and desire to protect by Letters Patent, is—

1. The combination of an oil-reservoir, a main outlet, and a valve for closing the same, together with several branch channels leading from said main outlet, and graduating-valves for controlling the flow of oil in each, substantially as described.

2. A lubricating-bearing which has a suitable inlet for oil, circular grooves at or near the ends of the bearing, and suitable ducts or channels leading from said grooves to other bearings, substantially as described.

3. The combination of an oil-reservoir, a main outlet from said reservoir, and a valve for closing the same, branch channels leading from said main outlet, and graduating-valves for controlling the flow of oil in the channels, together with lubricating-bearings, each of which bearings has grooves near its ends, and channels leading from said grooves to other bearings, substantially as described.

In testimony whereof I affix my signature in presence of two witnesses.

WILLIAM HECKERT.

Witnesses:
A. P. SMITH,
WASHN. DANENHOWER.